United States Patent

Webb

Patent Number: 5,507,955
Date of Patent: Apr. 16, 1996

[54] METHOD OF OPERATING HYDROCYCLONE SYSTEMS BY ADDING WATER TO MAINTAIN FLOW RATES

[75] Inventor: David A. Webb, Kew, Australia

[73] Assignee: Merpro Montassa Limited, Scotland

[21] Appl. No.: 923,912

[22] PCT Filed: Feb. 28, 1991

[86] PCT No.: PCT/GB91/00309

§ 371 Date: Mar. 16, 1993

§ 102(e) Date: Mar. 16, 1993

[87] PCT Pub. No.: WO91/12893

PCT Pub. Date: Sep. 5, 1991

[30] Foreign Application Priority Data

Mar. 2, 1990 [GB] United Kingdom ............ 9004714

[51] Int. Cl.⁶ ............................................. B01D 17/038
[52] U.S. Cl. .................. 210/741; 210/512.2; 210/739; 210/788; 210/805
[58] Field of Search ........................... 210/87, 90, 109, 210/188, 259, 512.1, 512.2, 739, 741, 787, 788, 805, 806; 494/1, 5, 10, 901

[56] References Cited

U.S. PATENT DOCUMENTS

| | | | |
|---|---|---|---|
| 4,544,486 | 10/1985 | Carroll | 210/512.1 |
| 4,622,150 | 11/1986 | Carroll | 210/739 |
| 4,659,461 | 4/1987 | Carroll | 210/512.2 |
| 4,737,287 | 4/1988 | Predergast | 210/512.2 |
| 4,822,484 | 4/1989 | Prendergast et al. | 210/512.1 |
| 4,844,812 | 7/1989 | Haynes et al. | 210/741 |
| 4,844,817 | 7/1989 | Flanigan et al. | 210/788 |
| 5,055,202 | 10/1991 | Carroll et al. | 210/739 |

FOREIGN PATENT DOCUMENTS

| | | | |
|---|---|---|---|
| 106629 | 11/1985 | European Pat. Off. | |
| WO85/00851 | 2/1985 | WIPO | 210/787 |
| WO87/01968 | 4/1987 | WIPO | 210/739 |
| WO89/04725 | 6/1989 | WIPO | 210/739 |

OTHER PUBLICATIONS

OTC Publ. 5594–Hydrocyclones: A Solution to Produced Water Treatment, 1987.
Maschinenkunde fuür Müller (Machine Science for Millers) 1986.

Primary Examiner—Joseph W. Drodge
Attorney, Agent, or Firm—Andrus, Sceales, Starke & Sawall

[57] ABSTRACT

In a method of operating a bank of parallel hydrocyclone separators for deoiling water, each separator has a mixture inlet, an overflow oil outlet and an underflow water outlet. The flow through at least one separator is sensed, either directly, or indirectly by sensing the pressure difference across the separator. If the flow approaches a threshold below which there is insufficient flow for satisfactory operation, an additional supply of water is fed to the mixture inlet fo the separators.

15 Claims, 1 Drawing Sheet

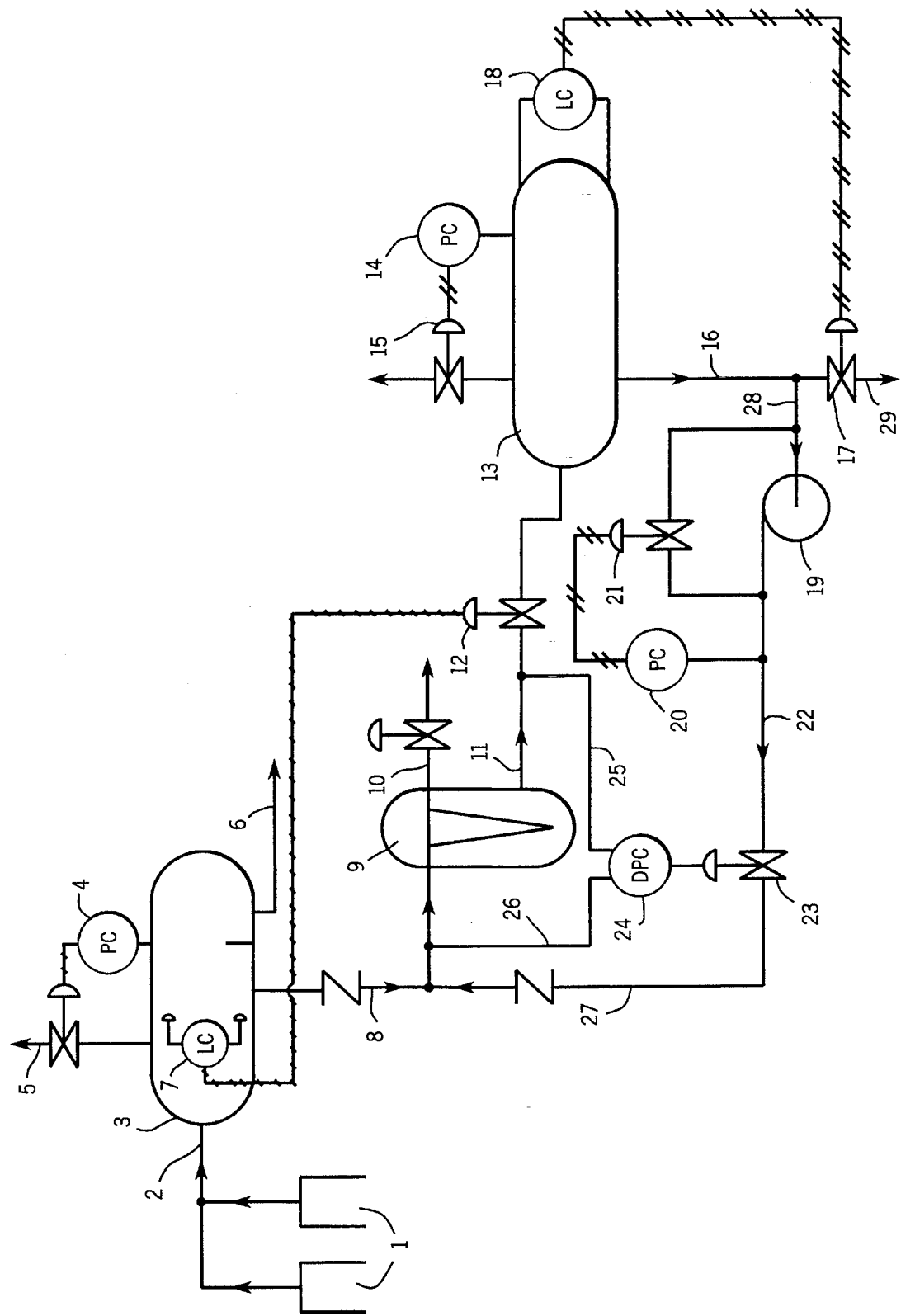

METHOD OF OPERATING HYDROCYCLONE SYSTEMS BY ADDING WATER TO MAINTAIN FLOW RATES

Hydrocyclones are used for de-oiling the water which is separated from production fluids on offshore oil platforms or other production facilities.

A plurality of hydrocylcones are required to cater for the maximum flow rate of water produced from sources and these are commonly grouped in banks, often with the different banks within different pressure vessels. Each individual hydrocyclone has a particular inlet flow rate range over which it efficiently separates oil from water and it is important that none of the hydrocyclones are operated in a manner such that the inlet flow rate falls below a minimum value. The flow rate of production fluids can vary appreciably, for example, the production of water can be comparatively low with a young field or upon start up after stoppage. Consequently, means have had to be provided for shutting off different hydrocyclones or banks of hydrocyclones using conventional valve means, and it is desirable that operations personnel be spared the labour-intensive task of switching on and off the various hydrocyclones upon a change in the flow rate of water to be de-oiled.

In accordance with the present invention, in a method of operating a system for de-oiling water, utilising hydrocyclone separators each having a mixture inlet, an overflow oil outlet and an underflow water outlet, the flow through at least one hydrocyclone is sensed, and if the flow approaches a threshold below which there is insufficient flow through the respective hydrocyclone(s) for satisfactory operation, an additional supply of water is fed to the mixture inlet(s) to maintain the flow safely above the threshold.

The invention is conveniently applied to a plurality of banks of the hydrocyclones, each bank acting in parallel having mixture inlet means leading to the mixture inlets of the hydrocyclones of the respective bank, an outlet means leading from the overflow oil outlets of the hydrocyclones of the respective bank, and water outlet means leading from the underflow water outlets of the hydrocyclones of the respective bank, wherein the flow through the bank of hydrocyclones is sensed and the additional supply of water is fed to the mixture inlet means to maintain the flow safely above the threshold through the hydrocyclones of the respective bank. Each of the banks may be mounted in a respective pressure vessel.

With this arrangement, it is unnecessary to shut down any hydrocyclones upon a reduction in the flow rate of water to be de-oiled, the hydrocyclones being maintained with a sufficient inlet flow for efficient operation by the automatic supply of additional water to the mixture inlets.

The sensing may be carried out indirectly by a differential pressure controller which effectively senses the pressure difference between the mixture inlet and underflow water outlets of the individual hydrocyclones, although in practice by sensing the pressure difference between the mixture inlet means and the water outlet means of a pressure vessel. These pressure differentials represent in a particular case the underflow rate of purified water. Alternatively, the flow rate could be measured more directly by means of a flow meter which senses either the mixture inlet flow rate or the underflow outlet flow rate.

The additional water may be from any source, such as adjacent sea water, but is conveniently water that has already been purified by the hydrocyclones and obtained, for example, from a degassing vessel which is used to deaerate the purified water downstream of the hydrocyclones.

An example of a system constucted to operate in accordance with the present invention is illustrated diagrammatically in the accompanying drawing.

As shown, a mixture of gas, oil and water flows from wells 1 into a manifold 2 and is discharged into a three phase separator 3 where partial separation of oil, gas, and water occurs by gravitational settlement. It is usual that the pressure within the three phase separator 3 is controlled by controlling the rate at which gas is expelled from the three phase separator. This is achieved by using a pressure controller 4 which senses the pressure in the three phase separator 3 and sends a signal to a control valve 5 so that an opening in the control valve 5 is adjusted to control the gas flow rate through this valve to maintain the pressure in the three phase separator 3 substantially constant at a predetermined value (set point). Oil is discharged from the three phase separator 3 through a pipe 6.

Water, which may have some oil dispersed within it, is discharged from the three phase separator 3 through a pipe 8 which connects within a bank of hydrocyclones 9, in this case contained within a pressure vessel. At least some of the oil in the water being fed into the hydrocyclones 9 is separated into a discharge stream from the hydrocyclones 9 which is relatively rich in oil. This stream flows through a pipe 10. The other discharge stream from the hydrocyclones 9 flows through a pipe 11 and is at least substantially decontaminated of oil, i.e. this stream consists of purified water.

Due to the fact that oil is less dense than water, the water exists as a layer situated below the oil in the three separator 3 where the bottom of the oil layer is in contact phase separator 3. Consequently there is an interface between the water and oil layers in the three phase with the top of the water layer. There is a level control means 7 which detects the elevation of this oil/water interface. The elevation of the oil/water interface may be adjusted by altering the rate at which water is discharged through the pipe 8 from three phase separator 3.

This is achieved by level control means 7 sending a control signal to adjust an opening of a valve 12 to adjust the flow rate of water through the valve 12 such that the oil/water interface in the three phase separator 3 is maintained substantially constant at a predetermined value (set point).

After passing through the control valve 12 the water then enters a degassing vessel 13. Owing to the fact that the pressure in the degassing vessel 13 is appreciably less than the pressure in the three phase separator 3, there may be a substantial quantity of gas associated with the water at the degassing vessel 13. This gas was previously dissolved in the water at the higher pressure experienced at the three phase separator 3.

There exists two layers in the degassing vessel 13, these being a gas layer which is located above a water layer. The elevation of the interface in the degassing vessel 13 is controlled by a level controller 18 and a control valve 17. Water is discharged from the degassing vessel 13 into a pipe 16. At least some of this water may flow through the control valve 17 and subsequently be discharged to the environment e.g. the sea at a location 29.

When a hydrocyclone is operating, a pressure drop occurs between the hydrocyclone inlet and the hydrocyclone outlet for purified water. This pressure drop may increase as the flow rate through the hydrocyclone increases.

There is a certain drop corresponding to the minimum flow rate through a hydrocyclone at which efficient separation occurs. A differential pressure controller 24 has a sensing line 26 which detects the pressure upstream of the group of hydrocyclones 9, and another sensing line 25 which detects the pressure of the purified water discharged from the hydrocyclones. The differential pressure controller 24 detects the pressure difference between the line 25 and 26 and sends a signal to a control valve 23. The differential pressure controller 24 has a particular set point. This set point corresponds to a differential pressure at which efficient separation by the hydrocyclones 9 will occur, for example, this set point may correspond to a differential pressure at which the hydrocyclones 9 may be operating at the minimum flow rate for each hydrocyclone at which efficient separation occurs.

A pump 19 has the capability of transferring water from the pipe 16 to the pipe 8 located upstream of the hydrocyclones 9. The extent of opening of the control valve 23 is controlled by the differential pressure controller 24 with the objective of maintaining the differential pressure beween the sensing line 26 and the sensing line 25 at or close to the set point.

When the flow rate of water flowing from the three phase separator 3 is substantial and sufficient alone to maintain the hydrocyclones 9 above the minimum flow rate for efficient separation, the differential pressure sensed by differential pressure controller 24 may be larger than the set point. In this circumstance, the differential pressure controller 24 may cause control valve 23 to close.

The pump 19 may receive water from a pipe 28 which may receive water from the pipe 16. The pump 19 causes an increase in water pressure, such that the pressure in a pipe 22 at the discharge side of the pump 19 is greater than the pressure in a pipe 28 on the suction side of the pump 19. There is a recycle line adjacent to the pump 19 such that at least some of the water discharged by the pump 19 may return to the suction side of the pump 19 after passing through a control valve 21, which, in conjunction with a pressure controller 20, is used to control the pressure in the pipe 22. The pressure controller 20 senses the pressure in the pipe 22 and sends a signal to the control valve 21 to maintain the pressure in pipe 22 at a particular set point. The flow rate of water from the pipe 22 to a pipe 27 is controlled by the differential pressure control valve 23.

I claim:

1. A method of operating a system for de-oiling water utilizing hydrocyclone separators, each of said hydrocyclone separators having a water-oil mixture inlet, an overflow outlet for separated oil, and an underflow outlet for de-oiled water, said hydrocyclone separators requiring a flow rate of a minimum magnitude therein for efficient separation of oil from water, said method comprising the steps of:

sensing the pressure difference between the pressure at the water-oil mixture inlet and the pressure at the underflow outlet of at least one hydrocyclone separator to ascertain the actual flow rate magnitude in the at least one hydrocyclone separator;

determining the correspondence of the actual flow rate magnitude to the minimum flow rate magnitude for the hydrocyclone separators; and supplying additional water to the water-oil mixture inlets of the hydrocyclone separators to raise the flow rates of the hydrocyclone separators above the minimum flow rate magnitude in response to the actual separator flow rate magnitude being below the minimum flow rate magnitude.

2. The method of claim 1 wherein said hydrocyclone separators of said system are arranged in parallel in a bank having a water-oil mixture inlet means and a de-oiled water outlet means and wherein the sensing step is further defined as sensing the pressure difference to ascertain the actual flow rate magnitude in the bank of hydrocyclone separators and the additional water supplying step is further defined as supplying water to the water-oil mixture inlet means of the bank of separators.

3. The method according to claim 2 wherein the sensing step is further defined as sensing the pressure difference between the pressure at the water-oil mixture inlet means for the bank of hydrocyclone separators and the pressure at the de-oiled water outlet means for the bank of hydrocyclone separators.

4. The method according to claim 2 wherein the bank of hydrocyclone separators is mounted in a pressure vessel and wherein the sensing step is further defined as sensing the pressure difference between the pressure at the water-oil mixture inlet means for the bank of separators in the pressure vessel and the pressure at the de-oiled water outlet means for the bank of separators in the pressure vessel.

5. The method according to claim 2 wherein the water supplying step is further defined as supplying additional water that has been previously de-oiled by said hydrocyclone separator system to the water-oil mixture inlet means of the bank of hydrocyclone separators.

6. The method according to claim 5 wherein the water supplying step is further defined as supplying additional water from a degassing vessel downstream of the bank of hydrocyclone separators.

7. The method according to claim 1 wherein the water supplying step is further defined as supplying additional water that has been previously de-oiled by the hydrocyclone separator system to the water-oil mixture inlets of hydrocyclone separators.

8. The method according to claim 7 wherein the water supplying step is further defined as supplying additional water from a degassing vessel downstream of the hydrocyclone separators.

9. A method of operating a system for de-oiling water utilizing hydrocyclone separators, each of said hydrocyclone separators having a water-oil mixture inlet, an overflow outlet for separated oil, and an underflow outlet for de-oiled water, said hydrocyclone separators requiring a flow rate of a minimum magnitude therein for efficient separation of oil from water, said method comprising the steps of:

sensing an operating condition in at least one hydrocyclone separator that is responsive only to the flow rate in the at least one hydrocyclone separator and is indicative of the magnitude thereof;

determining the correspondence of the sensed operating condition to the minimum flow rate magnitude for the hydrocyclone separators; and supplying additional water to the water-oil mixture inlets of the hydrocyclone separators to raise the flow rates of the hydrocyclone separators above the minimum flow rate magnitude in response to the sensed separator flow rate magnitude being below the minimum flow rate magnitude.

10. The method according to claim 9 wherein said hydrocyclone separators of said system are arranged in parallel in a bank having a water-oil mixture inlet means and a de-oiled water outlet means and wherein the sensing step is further defined as sensing an operating condition indicative of the flow rate magnitude in the bank of hydrocyclone separators and the additional water supplying step is further defined as supplying water to the water-oil mixture inlet means of the bank of separators.

11. The method according to claim 10 wherein the bank of hydrocyclone separators is mounted in a pressure vessel.

12. The method according to claim 10 wherein the water supplying step is further defined as supplying additional water that has been previously de-oiled by said hydrocyclone separator system to the water-oil mixture inlet means of the bank of hydrocyclone separators.

13. The method according to claim 12 wherein the water supplying step is further defined as supplying additional water from a degassing vessel downstream of the bank of hydrocyclone separators.

14. The method according to claim 9 wherein the water supplying step is further defined as supplying additional water that has been previously de-oiled by the hydrocyclone separator system to the water-oil mixture inlets of the hydrocyclone separators.

15. The method according to claim 14 wherein the water supplying step is further defined as supplying additional water from a degassing vessel downstream of the hydrocyclone separators.

* * * * *